United States Patent [19]
Moretto et al.

[11] Patent Number: 6,085,791
[45] Date of Patent: Jul. 11, 2000

[54] CLOSE-OFF AND CONNECTING UNIT FOR HYDROMASSAGE ORIFICES

[75] Inventors: Alessandro Moretto, Castion Di Zoppola; Loris Artuso, Giovanni Di Casarsa, both of Italy

[73] Assignee: American Standard Inc., Piscataway, N.J.

[21] Appl. No.: 09/110,010

[22] Filed: Jul. 2, 1998

[30] Foreign Application Priority Data

Jul. 3, 1997 [IT] Italy ................................. RE97A0048

[51] Int. Cl.[7] ................................................ F16K 31/122
[52] U.S. Cl. ........................ 137/869; 137/872; 137/878; 251/63.6; 251/63.5; 4/541.1
[58] Field of Search ................... 251/63.5, 63.6, 251/62; 137/869, 872, 878; 4/541.1, 541.2, 541.3, 541.4, 541.5

[56] References Cited

U.S. PATENT DOCUMENTS

| | | | |
|---|---|---|---|
| 1,319,738 | 10/1919 | Watrous | 137/878 X |
| 1,995,561 | 3/1935 | Belanger et al. | 251/63.3 |
| 2,169,043 | 8/1939 | Goehring | 137/872 X |
| 2,665,712 | 1/1954 | Pratt | 251/63.5 |
| 2,969,811 | 1/1961 | Freeman | 137/869 X |
| 3,025,881 | 3/1962 | Freeman | 137/869 X |
| 3,052,444 | 9/1962 | Kintner | 251/63.6 |
| 3,441,054 | 4/1969 | Mellan | 137/872 |
| 3,672,628 | 6/1972 | Aanstad | 251/63.6 X |
| 3,874,374 | 4/1975 | Jacuzzi | 128/66 |
| 4,356,833 | 11/1982 | Mayfield, Jr. et al. | 251/63.6 X |
| 4,592,100 | 6/1986 | Robertson et al. | 4/492 |
| 4,989,640 | 2/1991 | Steffes et al. | 137/872 X |
| 5,141,016 | 8/1992 | Nowicki | 137/872 X |

FOREIGN PATENT DOCUMENTS

| | | |
|---|---|---|
| 0354 596 | 2/1990 | European Pat. Off. . |
| 0376 845 | 7/1990 | European Pat. Off. . |
| 0418 204 | 3/1991 | European Pat. Off. . |
| 0590 228 | 4/1994 | European Pat. Off. . |
| 3507 472 | 9/1986 | Germany . |
| 3717 508 | 12/1988 | Germany . |
| 3928 464 | 3/1991 | Germany . |

*Primary Examiner*—Kevin Shaver
*Assistant Examiner*—John Bastianelli

[57] ABSTRACT

The present invention is a device which includes a connecting coupling for connection with hydromassage water circulation pipes, the connecting coupling having first coupling portion with a first aperture connected with an inlet of a hydromassage orifice, a second coupling portion with a second aperture axially opposed to the first aperture, and at least a third coupling portion with at least a third aperture, arranged at an angle with respect to the first aperture, the third aperture connected with a water circulation pipe. The device also includes a plug, capable of closing the first aperture, which is axially movable, within a coupling chamber, between the first and the second aperture and which is supported by a stem placed axially through the second aperture. Externally to the coupling, a mechanism is provided which is capable of displacing the stem of the plug axially, so as to bring the plug alternately against the first aperture, or below, at some distance from the latter.

19 Claims, 3 Drawing Sheets

CLOSE-OFF AND CONNECTING UNIT FOR HYDROMASSAGE ORIFICES

BACKGROUND OF THE INVENTION

The present invention relates generally to hydromassage tubs having a piping circuit for the circulation of water which supplies the orifices with discharging jets of water, and possibly with air/ozone.

As is well known, in more advanced systems cleaning of the piping system is effected by carrying out a wash cycle (circulating water and detergents and possibly other substances) in the piping circuit, while the orifices are kept closed, so that the basin of the tub is not affected by the wash liquid.

Therefore, it is important for the orifices to be capable of being closed effectively so as to hermetically isolate the basin of the tub from the piping circuit.

In addition, even if water is not discharged by said orifices, it is useful for the orifices to be capable of being closed to keep the water present in the tub from entering the piping circuit through such orifices, carrying with it organic particles and dirt.

At the present time, it is known that a plug, operated by an electric actuator, which closes off a section of passage of the water in the orifice, may be used to close the orifices.

This solution, however, has the drawback of requiring a special electric circuit for the operation of such actuators, with consequent costs for material, labor in making the circuit, labor due to the consequent complexity of the electronic control card and, in addition, risks to the user due to possible leakage of electric current. Another drawback lies in the fact that known devices for closing the orifices, due to their makeup and arrangement, necessarily occupy a relatively large space in the horizontal direction and perpendicular to the surface of the basin of the tub, thus contributing to making the dimensions of the whole hydromassage tub unnecessarily large.

Therefore, one object of the present invention is to procure means capable of closing the orifices which overcome the drawbacks mentioned above.

This and other objects are accomplished by the close-off and connecting unit for hydromassage orifices according to the present claimed invention.

SUMMARY OF THE INVENTION

The present invention includes, for every hydromassage orifice, a connecting coupling for the hydromassage water circulation pipes, having a first coupling portion with a first aperture connected with the inlet of the orifice, a second coupling portion with a second aperture axially opposed to the first, and at least a third coupling portion having at least a third aperture arranged at an angle with respect to the first aperture, connected with a water circulation pipe.

In addition, the present invention provides a plug, movable axially within a coupling chamber, between the first and the second aperture, capable of closing the first aperture, and supported by a stem placed axially through the second aperture, as well as means, placed externally to the coupling, capable of axially displacing the stem of the plug, so as to bring the plug alternately against the first aperture, or below, at some distance from the latter.

According to a preferred embodiment, the present invention provides a piston cylinder to actuate the stem supporting the plug, placed externally to the coupling in correspondence with the second aperture, having a stem defining the stem supporting the plug, and an operating chamber, in which a piston fixed to the stem moves, communicating with a means of introduction of operating fluid, for operating of the piston.

In particular, the said connecting coupling may be a common three-way or four-way cross coupling that is thus used as a component of the piping circuit.

The present invention allows operation of the plugs of the orifices by means of air or water placed under suitable pressure (a relatively low pressure is sufficient) or directly by means of water coming directly from the public supply system.

All electric wiring necessary to close the orifices is therefore eliminated, and consequently the above-mentioned drawbacks deriving from such wiring are eliminated.

Moreover, the unit in question has a structure that is produced in a substantially flat and vertical fashion and hence occupies a relatively small space with respect to the horizontal dimension and perpendicular to the outline in plan of the basin, and consequently less space is taken up in plan for the tub.

Another advantage provided by the present invention is the ability of the unit to also conveniently be applied to orifices of any kind, including those not expressly designed for the present invention, since the present invention requires no special characteristics for said orifices.

Advantageously, the present invention requires no special molds (and therefore no greater costs) to manufacture the orifices with plastic materials.

BRIEF DESCRIPTION OF THE DRAWINGS

The present invention is explained in detail below with the aid of the accompanying figures, which illustrate one non-exclusive embodiment thereof.

DETAILED DESCRIPTION OF THE PREFERRED EMBODIMENTS

Figure 1:
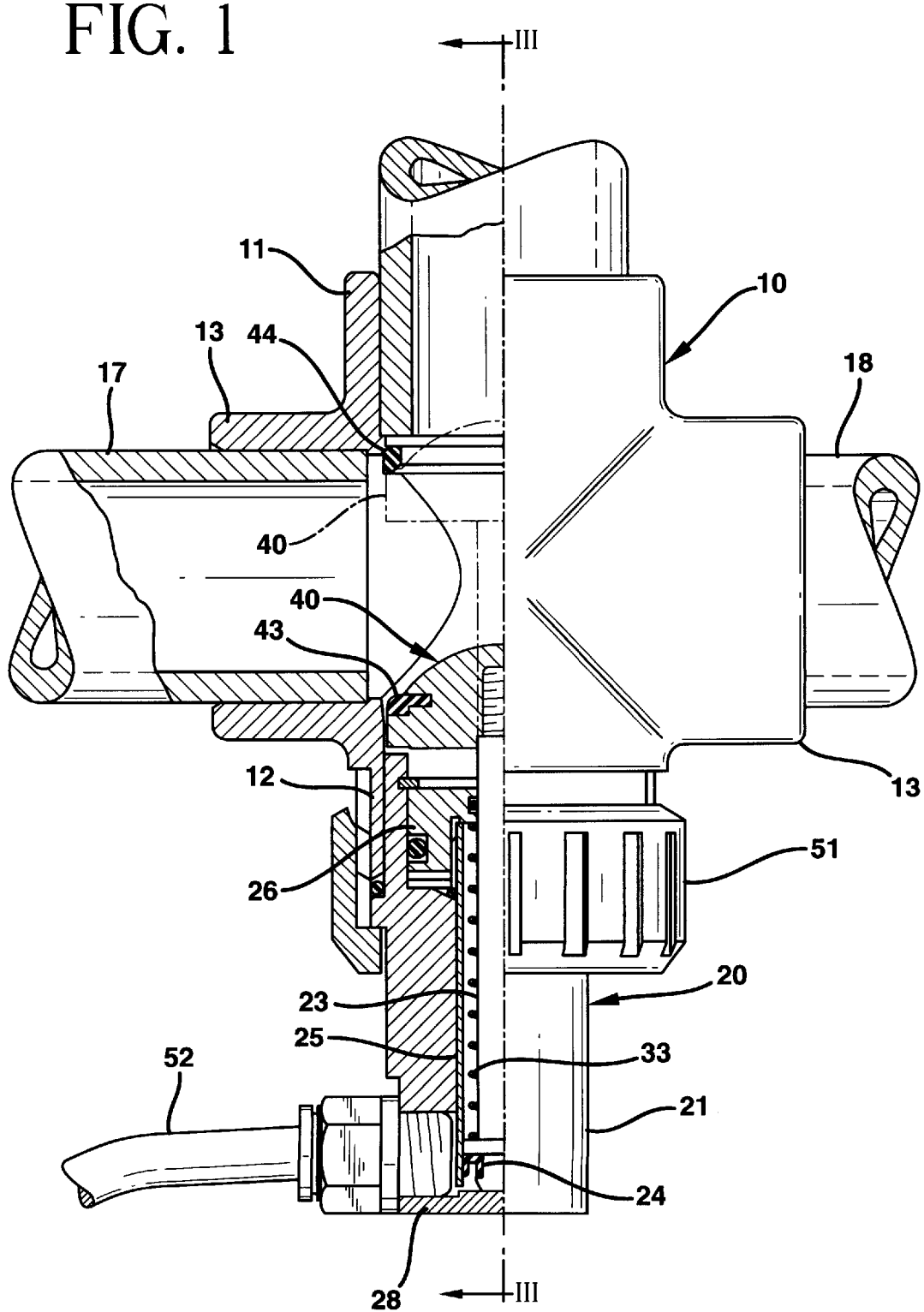
FIG. 1 is a vertical elevational view, partially in section, of the present invention applied to a piping circuit for the circulation of hydromassage water.
Figure 2:
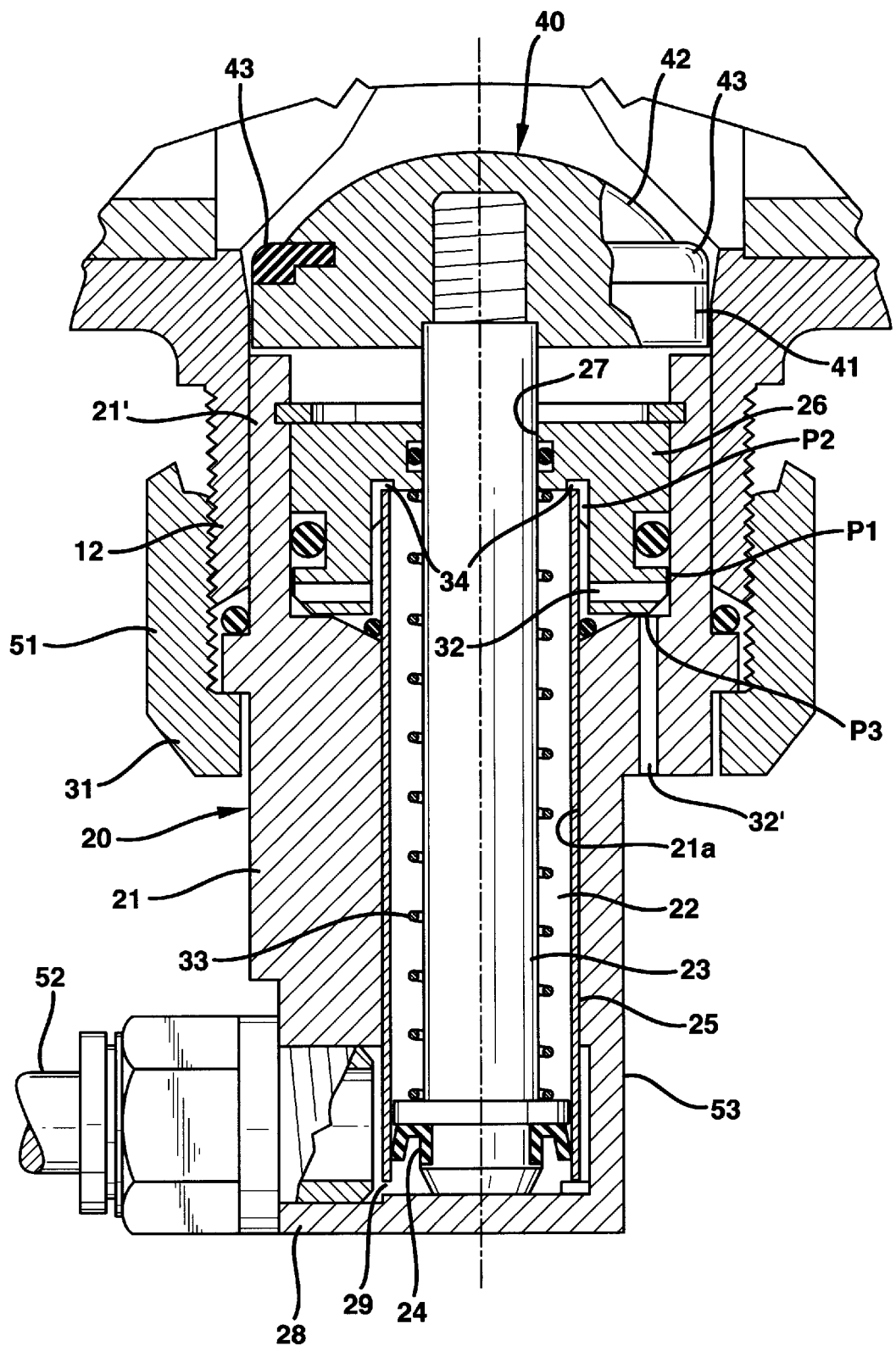
FIG. 2 is an enlarged detail of FIG. 1.

As schematically illustrated in the Figures, the present invention comprises a connecting coupling 10, having a first coupling portion with a first cylindrical aperture, in particular having the shape of a short tubular member, connected with the inlet 16 of an orifice 15 for supplying water for hydromassage, of any type. The coupling 10 also has a second coupling portion 12 with a second cylindrical aperture, in particular having the shape of a short tubular member, axially opposed to the first aperture.

On the side of the first coupling portion first aperture 11, the coupling 10 has two additional third coupling portions 13, axially opposed to one another, in particular having the shape of short tubular members. These third coupling portions 13 are capable of being connected respectively with a pipe 17 and a pipe 18, comprising part of the piping circuit (of known type and not illustrated in the figures) through which water circulates under pressure, driven by a pump, which supplies the various hydromassage orifices 15.

Alternatively, the coupling 10 may have a single third coupling portion 13, connected to a corresponding water circulation pipe.

In practice, the coupling 10 may be a conventional four-way or three-way cross coupling, composed of two tubular elements intersecting in a cross or as a "T."

Typically, the coupling 10 is applied to the hydromassage tub in an arrangement in which the axis of the two apertures of first and second coupling portions 11 and 12 is vertical and the inlet 151 of the orifice 15 is connected to the first coupling portion 11 by means of a short pipe 152 bent at an angle, like an elbow coupling. According to the embodiment illustrated in the figures, the first coupling portion 11 is turned upward, while the second coupling portion second aperture 12 is turned downward.

A piston cylinder assembly, indicated as a whole by reference numeral 20, and whose axis coincides with the axis of the two of the coupling portions 11 and 12, is fixed to the second coupling portion 12 from below.

The piston cylinder 20 comprises a lower member 21, generally cylindrical in shape, whose upper portion 21' is forced into the second aperture 12 and is made integral with said aperture by means of a threaded ring nut 51, which engages axially with the portion 21' and is screwed on to the threaded external surface of coupling portion 12. The threaded ring nut 51 has a flange 31 which draws the piston cylinder assembly 20 toward the second aperture 12.

Inside the member 21 is formed an axial cylindrical chamber 22 in which a stem 23 moves with the corresponding piston 24.

According to the embodiment illustrated in the figures, the member 21 has an axial cavity 21a inside which a cylindrical sleeve 25 is placed to fit, defining the lateral wall of said axial chamber 22.

At its lower end, the stem 23 carries a piston 24, designed with a seal placed around the stem 23, which slides against the internal surface of the sleeve 25.

The upper portion 21' of the member 21 has a widening of the diameter of its axial cavity 21a; in this widening is placed an upper closing member 26 which closes the upper end of the cylindrical chamber 22 and has a hole 27 through which the stem 23 passes to fit sealingly. A spring 33, acting by compression, which constantly pushes the stem 23 downward, is provided in the chamber 22, above the piston 24. An aperture 28, capable of being connected with a pipe 52 carrying fluid (typically air) under pressure, is provided in the lower portion of the member 21. Said aperture 28 reaches the lower zone of the sleeve 25 and communicates with the axial chamber 22 by a passageway 29 made in the lower edge of the sleeve 25, which permits passage of the fluid between the aperture 28 and the chamber 22.

The diameter of the external surface of the lower portion of the closing member 26 is slightly smaller than the diameter of the corresponding cylindrical surface of the cavity 21a of the member 21; therefore, a narrow cylindrical interspace P1 is defined between these two surfaces. Coaxial to the interspace P1, there is provided a second interspace P2, located further inside, made between the external surface of the sleeve and the internal cylindrical surface of the member 26, which surrounds the upper zone of the sleeve 25. This interspace P2 communicates with the first interspace P1 through a pair of radial through-holes 32 made in the closing member 26. In turn, the interspace P2 communicates with the upper zone of the axial chamber 22 by means of blind holes 34 made in the upper part of the cavity 21a. In addition, another narrow interspace P3 is defined between the lower radial surface of the closing member 26 and the corresponding facing radial surface of the cavity 21a; this narrow radial interspace P3 communicates with the cylindrical interspace P1 mentioned above and with the external environment through a vertical hole 32', provided in the upper portion 21' of the member 21 and in correspondence with a flattening 53 made in the lower part of the member 21.

When fluid under pressure is sent through the aperture 28, the fluid penetrates into the part of the axial chamber 22 located below the piston 24 and, overcoming the thrust of the spring 33, displaces the stem 23 upward. At the same time, the air present in the part of the chamber 22 located above the piston 24 is discharged to the outside through the holes 32, 32' and 34 and said interspaces P1, P2, and P3.

At the upper end of the stem 23 is fixed a plug 40 located in the cavity of the coupling 10, having a circular shape in plan. The plug 40 is composed of a lower, substantially disk-shaped portion 41, superposed by an upper portion 42, in the shape of a spherical cap.

Figure 3:
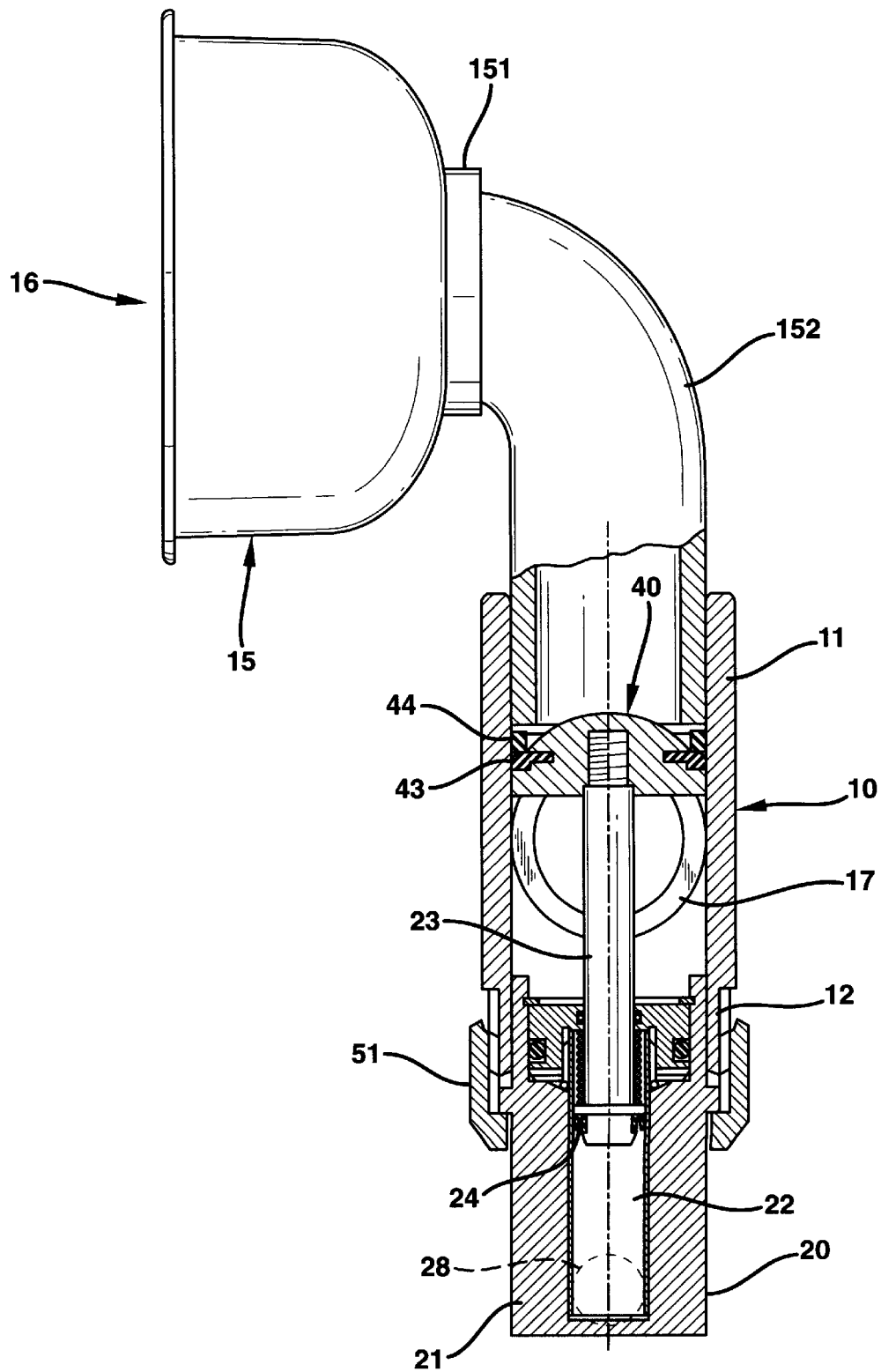
FIG. 3 is the section along the plane III—III of FIG. 1.

An annular gasket 43, capable of engaging sealingly with a corresponding annular seat 44 located in correspondence with the lower extremity of the first aperture 11, is provided at the base of the cap 42. The preferred embodiment of the annual seat 44 shown in FIGS. 1 and 3 consists of a flat ring whose external cylindrical surface is forced into contact with the cylindrical internal surface of the coupling portion 11.

Normally, or when the piston cylinder 20 is not subject to the action of fluid under pressure, the plug 40 is held down on the second aperture of the second coupling portion 12 via the action of the spring 33. In said position, the plug 40 is not an obstacle to the passage of water through the coupling 10, since the plug occupies only a small part of the section of the chamber of the coupling 10.

Following upward displacement of the stem 23, caused by fluid under pressure let into the chamber 22, the plug 40 is carried upward until its annular gasket 43 presses against the seat 44, completely closing the section of the aperture of the first coupling portion 11 and thus closing off access to the orifice 15 by the liquid present in the pipes 17 and 18.

In this position, the plug is not an obstacle to the passage of water between the two apertures 13 since, in this case as well, the plug occupies only a small part of the section of the chamber of the coupling 10. Nor is the stem 23 an obstacle to the passage of water between the apertures 13, inasmuch as it occupies only part of the section of the chamber of the coupling 10.

In use, when fluid under pressure is sent into the lower part of the chamber 22 of the close-off units applied to the various orifices 15, closing of the apertures of corresponding first coupling portions 11 which connect the piping circuit to the orifices 15 is thus produced, and therefore the basin of the tub is isolated from the piping circuit, and accordingly closing of the orifices is obtained, while the piping circuit, however, remains open, in particular to facilitate a pipeline wash cycle.

As an alternative to air under pressure, water under pressure, coming, for example, from the ordinary public water supply system, may advantageously be used.

In addition, the piston cylinder 20 may be replaced by an electrically operated actuator.

Clearly, numerous modifications of a practical nature may be made in the invention in question without thereby exceeding the scope of the inventive idea as claimed below.

What is claimed is:

1. A close-off valve for use in a fluid circulation system for a hydromassage tub, the circulation system including a piping circuit for delivering liquid to the tub in a normal state and for circulating liquid in the piping circuit in a closed-off state, the system also including a control fluid pressure source, the tub including one or more hydromassage orifices through which liquid is introduced into the tub, said valve comprising:

a coupling body having an interior which defines a coupling chamber and having at least three coupling portions including:

a tub coupling portion for connection to one of the hydromassage orifices, said tub coupling portion having a tub delivery aperture, a control coupling portion disposed axially opposite said tub coupling portion, and at least one piping coupling portion for connection to the piping circuit; and a piston cylinder means disposed on said control coupling portion including:

a cylinder body disposed on said control coupling portion for connection with the control fluid pressure source and being provided with a restricted passageway for communication with the atmosphere; and a piston movably disposed within said cylinder body, said piston including a stem having a distal end which extends out of said cylinder body and into said coupling chamber, the distal end of said stem including a plug, the proximal end of said stem being fully enclosed within said cylinder body, wherein said piston cylinder means allows fluid flow through said at least one piping coupling portion and through said tub coupling portion into the hydromassage tub in a normal state, and wherein said piston is adapted to seal off fluid flow through said tub delivery aperture in response to the control fluid pressure source in a closed-off state;

whereby liquid is capable of being delivered to the tub through said valve in a normal state and liquid is prevented from being delivered to the tub in a closed-off state, said valve being remotely actuated without requiring manual intervention, or the introduction of electrical controls, in the vicinity of said valve.

2. The close-off valve according to claim 1 wherein said piston cylinder means is removably attached to said control coupling portion.

3. The close-off valve according to claim 2 further comprising a nut for removably attaching said piston cylinder means to said control coupling portion.

4. The close-off valve according to claim 1 wherein said piston cylinder means further comprises a biasing means for biasing said plug away from said tub coupling portion.

5. The close-off valve according to claim 4 wherein said biasing means comprises a spring disposed in said axial cylindrical chamber.

6. The close-off valve according to claim 1 wherein said plug further comprises a substantially hemispherical head.

7. The close-off valve according to claim 6 wherein said plug further comprises an annular gasket disposed around a sector of said hemispherical head.

8. A control valve for use in a piping circuit for a hydromassage tub and a pressurized fluid source, the hydromassage tub having one or more hydromassage orifices supplied by the piping circuit, the piping circuit including a pressurized control fluid source, said control valve comprising:

a connecting coupling having:
a body with at least three coupling portions including:
a first coupling portion provided with a first aperture for connection with one of the hydromassage orifices,
a second coupling portion provided with a second aperture, axially opposed to the first aperture, for connection with the pressurized source, and
at least one other coupling portion provided with an aperture arranged at an angle with respect to the first aperture, for connection with the piping circuit, said body being provided with a coupling chamber for connecting in fluid communication said first coupling portion and said
at least one other coupling portion; and a piston cylinder means depending from said second coupling means and disposed at least partially within said second aperture, including:

a cylinder body defining an axial cylindrical chamber, said cylinder body being provided with an aperture for fluid connection to the pressurized fluid source to enter and exit said axial cylindrical chamber and being provided with a restricted passageway for communication with the atmosphere, and a piston disposed at least partially within said axial cylindrical chamber, said piston having a stem which extends into said coupling chamber, the distal end of said stem including a plug, the proximal end of said stem being fully enclosed within said cylinder body, wherein said piston is capable of being moved in response to pressurization of said axial cylindrical chamber such that said plug is capable of moving axially within the coupling chamber between said first and said second apertures, wherein said plug is capable of selectively closing said first aperture and said second aperture;

whereby said control valve is capable of selectively allowing flow into the hydromassage tub through the hydromassage orifice.

9. The control valve according to claim 8 wherein said piston cylinder means is removably attached to said second coupling portion.

10. The control valve according to claim 9 further comprising a nut for removably attaching said piston cylinder means to said second coupling portion.

11. The control valve according to claim 8 wherein said piston cylinder means further comprises a biasing means for biasing said plug toward said second aperture.

12. The control valve according to claim 11 wherein said biasing means comprises a spring disposed in said axial cylindrical chamber.

13. The control valve according to claim 8 wherein said plug further comprises a substantially hemispherical head.

14. The control valve according to claim 13 wherein said plug further comprises an annular gasket disposed around a sector of said hemispherical head.

15. A piping circuit for use with a hydromassage tub and a pressurized fluid source, the hydromassage tub having at least one hydromassage orifice, said piping circuit comprising:

circulation piping;
a connecting coupling connected to said circulation piping and having:
a body with at least three coupling portions including:
a first coupling portion provided with a first aperture for connection with the at least one hydromassage orifice,
a second coupling portion provided with a second aperture, axially opposed to the first aperture, for connection with the pressurized source, and
at least one other coupling portion provided with an aperture arranged at an angle with respect to the first aperture, for connection with said circulation piping,
said body being provided with a coupling chamber for connecting said first coupling portion and said at least one other coupling portion in fluid communication; and a piston cylinder means disposed in said second aperture, including:
- a cylinder body defining an axial cylindrical chamber, said cylinder body being provided with an aperture for allowing pressurized fluid from the pressurized fluid source to enter said axial cylindrical chamber and being provided with a restricted passageway for communication with the atmosphere, and
- a piston disposed at least partially within said axial cylindrical chamber, said piston having a stem which extends into said coupling chamber, the distal end of said stem including a plug, the proximal end of said stem being fully enclosed within said cylinder body, wherein said piston is capable of being moved in response to pressurized fluid in said axial cylindrical chamber such that said plug is capable of moving axially within the coupling chamber between said first and said second apertures, wherein said plug is capable of selectively closing said first aperture and said second aperture;

whereby said at least one hydromassage orifice is capable of being selectively opened and closed.

16. The piping circuit according to claim 15 wherein the axis common to said first aperture and said second aperture is vertical.

17. The piping circuit according to claim 15 wherein the inlet of the hydromassage orifice is connected to said first aperture by a pipe bent at an angle of about 90 degrees.

18. The piping circuit according to claim 15 further comprising an annular seat disposed in said first coupling portion and wherein said plug comprises an annular gasket which is capable of sealingly engaging said annular seat.

19. The piping circuit according to claim 15 wherein said annular seat is a flat ring.

* * * * *